US011295520B2

(12) United States Patent
Han et al.

(10) Patent No.: US 11,295,520 B2
(45) Date of Patent: Apr. 5, 2022

(54) METHODS FOR STREET LIGHTING VISUALIZATION AND COMPUTATION IN 3D INTERACTIVE PLATFORM

(71) Applicant: SIGNIFY HOLDING B.V., Eindhoven (NL)

(72) Inventors: Dong Han, Newton, MA (US); Yuting Zhang, Winchester, MA (US); Olaitan Philip Olaleye, Wakefield, MA (US); Sirisha Rangavajhala, Wakefield, MA (US)

(73) Assignee: SIGNIFY HOLDING B.V., Eindhoven (NL)

(*) Notice: Subject to any disclaimer, the term of this patent is extended or adjusted under 35 U.S.C. 154(b) by 0 days.

(21) Appl. No.: 16/634,161

(22) PCT Filed: Jul. 24, 2018

(86) PCT No.: PCT/EP2018/070021
§ 371 (c)(1),
(2) Date: Jan. 26, 2020

(87) PCT Pub. No.: WO2019/020615
PCT Pub. Date: Jan. 31, 2019

(65) Prior Publication Data
US 2020/0234492 A1 Jul. 23, 2020

Related U.S. Application Data

(60) Provisional application No. 62/537,445, filed on Jul. 26, 2017.

(30) Foreign Application Priority Data

Aug. 9, 2017 (EP) ..................... 17185487

(51) Int. Cl.
G06T 17/05 (2011.01)
G06T 11/20 (2006.01)
H05B 47/11 (2020.01)

(52) U.S. Cl.
CPC ............ *G06T 17/05* (2013.01); *G06T 11/206* (2013.01); *H05B 47/11* (2020.01)

(58) Field of Classification Search
CPC .................. G06T 17/05; G06T 11/206; G06T 2219/2012; G06T 19/20; G06T 11/00; H05B 47/11; H05B 47/10; F21S 8/085
See application file for complete search history.

(56) References Cited

U.S. PATENT DOCUMENTS 9,091,417 B2 7/2015 Castillo et al.
9,113,514 B2 8/2015 Wang et al.
(Continued)

FOREIGN PATENT DOCUMENTS

TW 201351335 A 12/2013
WO 2012158980 A1 11/2012
WO 2015195645 A1 12/2015

OTHER PUBLICATIONS

Gianluca Paravato et al, "An Immersive Visualization Framework for Monitoring, Simulating and Controlling Smart Street Lighting Networks", DOI 10.4108/CST.SIMUTOOLS.2012.247739, pp. 17-26.
(Continued)

*Primary Examiner* — Grace Q Li
(74) *Attorney, Agent, or Firm* — Daniel J. Piotrowski

(57) ABSTRACT

A system and corresponding method is disclosed for monitoring and conducting large-scale performance verification of a city's lighting infrastructure. In particular, the current invention combines measurements of lighting performance measurements along city roadways with regulatory requirements for the roadways. In various embodiments, the current invention then presents a three-dimensional visualization of
(Continued)

the 5 adequacy of existing roadway lighting with respect to these regulatory requirements.

14 Claims, 7 Drawing Sheets

(56) References Cited

U.S. PATENT DOCUMENTS

| | | | |
|---|---|---|---|
| 9,646,499 B1* | 5/2017 | Finlow-Bates | H04L 67/22 |
| 2013/0140995 A1 | 6/2013 | Jones | |
| 2013/0181609 A1 | 7/2013 | Agrawal | |
| 2014/0368642 A1 | 12/2014 | Balazs et al. | |
| 2015/0154404 A1 | 6/2015 | Patel et al. | |
| 2015/0173156 A1* | 6/2015 | Pedersen | G01J 1/0219 |
| | | | 315/151 |
| 2015/0206016 A1* | 7/2015 | Chiu | G06K 9/00812 |
| | | | 348/36 |
| 2016/0342701 A1 | 11/2016 | Sung et al. | |
| 2017/0118390 A1* | 4/2017 | Miyazaki | H04N 5/23245 |
| 2018/0094415 A1* | 4/2018 | Slate | E03C 1/302 |
| 2018/0338105 A1* | 11/2018 | Ml | G09G 5/10 |
| 2019/0043339 A1* | 2/2019 | Bernal | |

OTHER PUBLICATIONS

Synopsys Silicon to Software, "Street Lighting Design in Light-tools" Design, Analyze and Optimize Street Lighting Fixtures, Datasheet, May 2012.

F. Lamberti et al,"Web-based 3D Visualization for Intelligent Street Lighting", Politechnic Di Torino, Web3D 2011, June 20-22, Paris.

* cited by examiner ies. Maintaining such
METHODS FOR STREET LIGHTING VISUALIZATION AND COMPUTATION IN 3D INTERACTIVE PLATFORM

CROSS-REFERENCE TO PRIOR APPLICATIONS

This application is the U.S. National Phase application under 35 U.S.C. § 371 of International Application No. PCT/EP2018/070021, filed on Jul. 24, 2018, which claims the benefit of U.S. Patent Provisional Application No. 62/537,445, filed on Jul. 26, 2017 and European Patent Application No. 1715487.0, filed on Aug. 9, 2017. These applications are hereby incorporated by reference herein.

FIELD OF THE INVENTION

This application relates to the field of light management systems and more particularly to a method and a system to monitoring and displaying lighting levels along public streets. In one embodiment these levels are displayed relative to regulatory requirements for the street(s) being analyzed. In various additional embodiments, the present invention presents the data in a various visual and interactive formats that provide useful tools to lighting design experts and regulatory agencies.

BACKGROUND OF THE INVENTION

Roadway lighting, a critical infrastructure for urban areas, has profound impact on numerous aspects of people's lives. Well-lit roadways enhance driving conditions, safety, and overall quality of life in cities, which have increasingly become overpopulated and congested with traffic. Given their immense utility, the Illuminating Engineering Society (IES) and the International Commission on Illumination have recommended street-specific lighting levels based on the traffic and pedestrian usage patterns. Maintaining such an extensive infrastructure and ensuring adherence to the standards is essential to the citizens' well-being.

SUMMARY OF THE INVENTION

Accordingly, city governments and street lighting providers typically invest significant money annually to maintain and improve lighting conditions. A substantial amount of those costs relates to measuring current lighting conditions on roadways in order to assess the actual lighting conditions and to ensure that they meet the regulatory standards for the type of roadway being measured. With those significant expenses and with the resulting volume of data that is involved, a need exists to automate the process and to present results in an efficient and effective manner. In particular, in various embodiments of the current invention, visualization techniques are used to provide readily recognizable insights to lighting professionals reviewing the data.

The current invention combines measurements of lighting performance measurements along one or more city roadways with regulatory requirements for the roadways. In various embodiments, the current invention then presents a three-dimensional visualization of the adequacy of existing roadway lighting with respect to these regulatory requirements.

In the following detailed description, for purposes of explanation and not limitation, representative embodiments disclosing specific details are set forth in order to provide a thorough understanding of the claimed invention. However, it will be apparent to one having ordinary skill in the art having had the benefit of the present disclosure that other embodiments according to the present teachings that depart from the specific details disclosed herein remain within the scope of the appended claims. Moreover, descriptions of well-known apparatus and methods may be omitted so as to not obscure the description of the representative embodiments. Such methods and apparatus are clearly within the scope of the claimed invention.

BRIEF DESCRIPTION OF THE DRAWINGS

The above and other exemplary features, aspects, and advantages of the present invention will be more apparent from the following detailed description taken in conjunction with the accompanying drawings, in which.

Figure 1:
FIG. 1 illustrates an exemplary embodiment of the current invention in which a three dimensional (3D) visualization of street lighting conditions are displayed.

It is to be understood that these drawings are solely for purposes of illustrating the concepts of the invention and are not intended as a definition of the limits of the invention. It will be appreciated that the same reference numerals, possibly supplemented with reference characters, where appropriate, have been used throughout to identify corresponding parts.

DETAILED DESCRIPTION OF THE EMBODIMENTS

As noted above, the current invention relates to first attaining lighting measurements along one or more roadways. In various embodiments of the invention, each of these measurements has at least three values associated with it: two values designating the geo-location coordinates (latitude and longitude) and one value of the lighting measurement (illuminance or luminance). Various means are contemplated for obtaining this data. Databases, where traditional manual measurements have been attained, may be available. Some modern street lighting systems have the capability of approximating street level measurements from the known location and height of street lights and their lux levels. Thus, an additional database may be available with this data. While these methods are capable of being employed, they do not take into account changes that may have occurred over time (e.g., due to mechanical failures or reduced luminance of street lights due to age or discoloration of lens covers). Accordingly, the preferred embodiment of the present invention contemplates attaining lighting measurements by employing sensors on one or more host vehicles that traverse the city streets and obtain current light level measurements at discreet points along the roadway and provide these measurements to a central processing unit. Such a system is described U.S. Pat. No. 9,113,514 entitled "Outdoor Lighting Network Light Change/Optimization System," hereby incorporated by reference in its entirety.

By enabling large-scale lighting measurements in this manner, the current invention can be used to provide cities with insights about their lighting installations. That is, by analyzing the illuminance-levels incident along different roads and matching this information with a database of attributes of the roads, the invention enables verification of whether any sections of the road fail to meet lighting standards. Such standards may include the minimum level of required light in view of the road's speed limit.

Once light measurements are attained, various embodiments of the invention output a 3D visualization of distinct attributes which reflect the true lighting conditions of the roadway (including but not limited to illuminance, illuminance uniformity, strobing, cycling, luminosity and other unique attributes of the lighting condition). An example of the visualization output is shown in FIG. 1, in which a 3D model 110 of a portion of a city is depicted. 3D modelling of cities is well known in the art. The current invention incorporates the light measurements into the city model and plots each measured illuminance value as an upright line 120 in the 3D space. In particular, as identified in section 105 of the exemplary output, the indicated measurements were obtained along sections of Rue Alfred de Musset.

In various embodiments of the invention, the 3D visualization depicts each data point as an upright line, wherein the length of each line can be a fixed ratio to the lighting measurement (such as lux). That is, as shown in FIG. 1, the data point with a larger lux value will have a higher line, a data point with a smaller lux value will have a shorter line. This method makes sure the visualization of each data point is presented clearly to users, especially the relationship of consecutive measured data points. FIG. 1 also makes use of shading to aid in visually distinguishing measured light values. A legend for this shading is provided in section 130 of the display. In further embodiments, colors associated with light heights can be utilized for this purpose.

As depicted in FIG. 1, an embodiment of the invention provides an interactive display that permits each vertical line to be clickable to thereby retrieve the original data entry. That is, when a user clicks one line, a pop-up information box 140 is displayed that provides the detailed information of that data point. Thus as shown in FIG. 1, the Latitude, Longitude, and the measured raw lux value are provided in section 140 of the display.

Each line represents a lux value collected at that specific location. Consequently, when the light data sampling rate is high, the distance between two-consecutive lines may be very close, which could cause the user to view as a single vertical line what is in fact a group of lines closely together. The interactive nature of the display permits the use to zoom in on the area of interest such that individual discrete lines appear permitting clicking on the individual lines and obtaining the corresponding light data for the locations involved.

Figure 2:
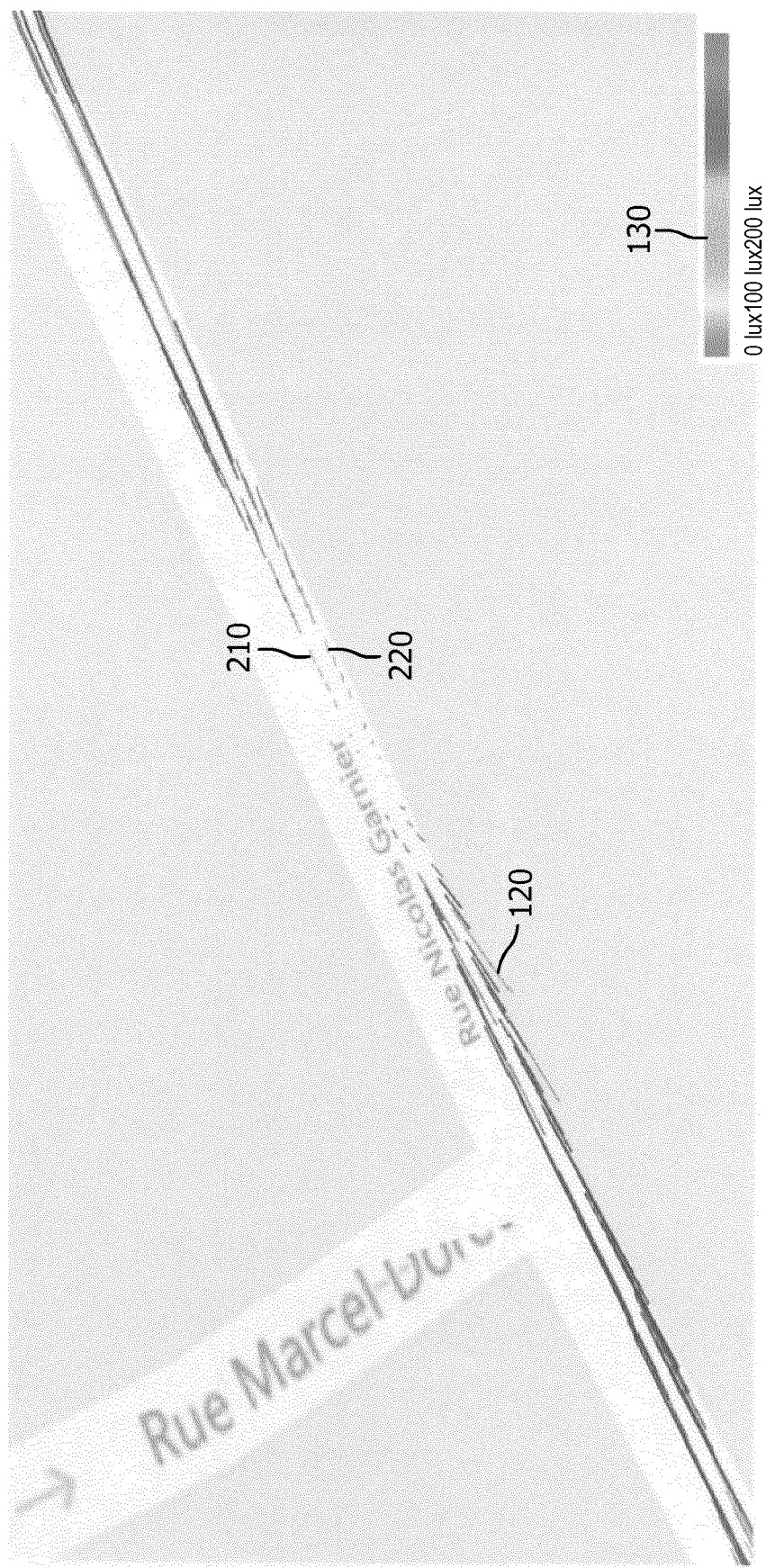
FIG. 2 illustrates an exemplary 3D display provided by the invention in which data collection points are depicted across the width of a roadway.

In another embodiment of this work, if there are multiple data measured width-wise along a roadway, the data points can be displayed at their measured locations as depicted in FIG. 2. That is, FIG. 2 shows the data points from a more vertical, top-down angle in which two tracks of data, collected on each side of the roadway, are shown in the output (where items 210 and 220 depict the left and right sides of the roadway, respectfully). It should be noted that while the slightly oblique nature of the depicted lines (e.g., item 120) permit a user to determine its relative height, the use of shading, and in particular, coloring of the lines enables the user to more easily discern the lighting levels of the depicted points.

Figure 3:
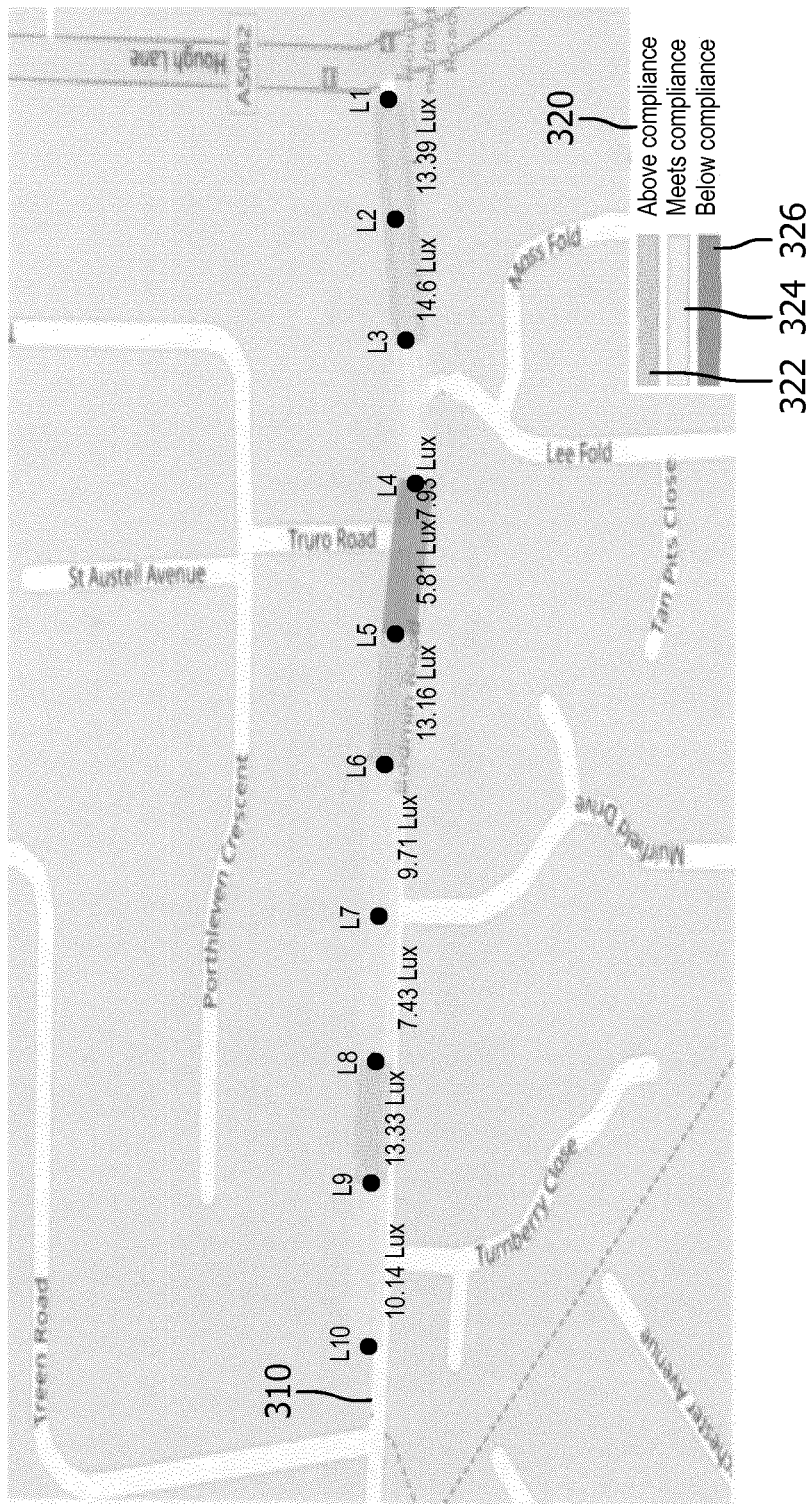
FIG. 3 illustrates an exemplary 3D display provided by the invention in which compliance with lighting regulations is depicted.

In additional embodiments of the invention, a roadway's lighting conditions are automatically checked to see whether they meet or exceed design compliance. A graph is then presented to indicate the detailed results on the map interface as illustrated in FIG. 3. City officials or lighting company personnel could use these results to adjust the lights on the street, either to increase the lights to avoid any safety risks, or dim down the lights to save energy.

In various embodiments of the invention, FIG. 3 is derived using the road's classification and the street lighting design regulation for such a classification. In one such embodiment, a user can pre-set ranges of average values of illuminance between two neighboring street lighting poles (where points labelled L1, L2, . . . , L10 depict the light pole positions). For example, the compliance range for road 310 in FIG. 3 is set between 7.25 lux and 12.25 lux. The current invention can calculate the average illuminance using all of the data collected between every two consecutive lighting poles, and compare this average illuminance value to the compliance range. Then shading (or coloring) can then be employed to indicate if each block between two poles meets the compliance. By way of example, legend 320 depicts three types of shading: indicating that the measured lighting is below, meets, or exceeds compliance (items 326, 324 and 322, respectively).

Figure 4:
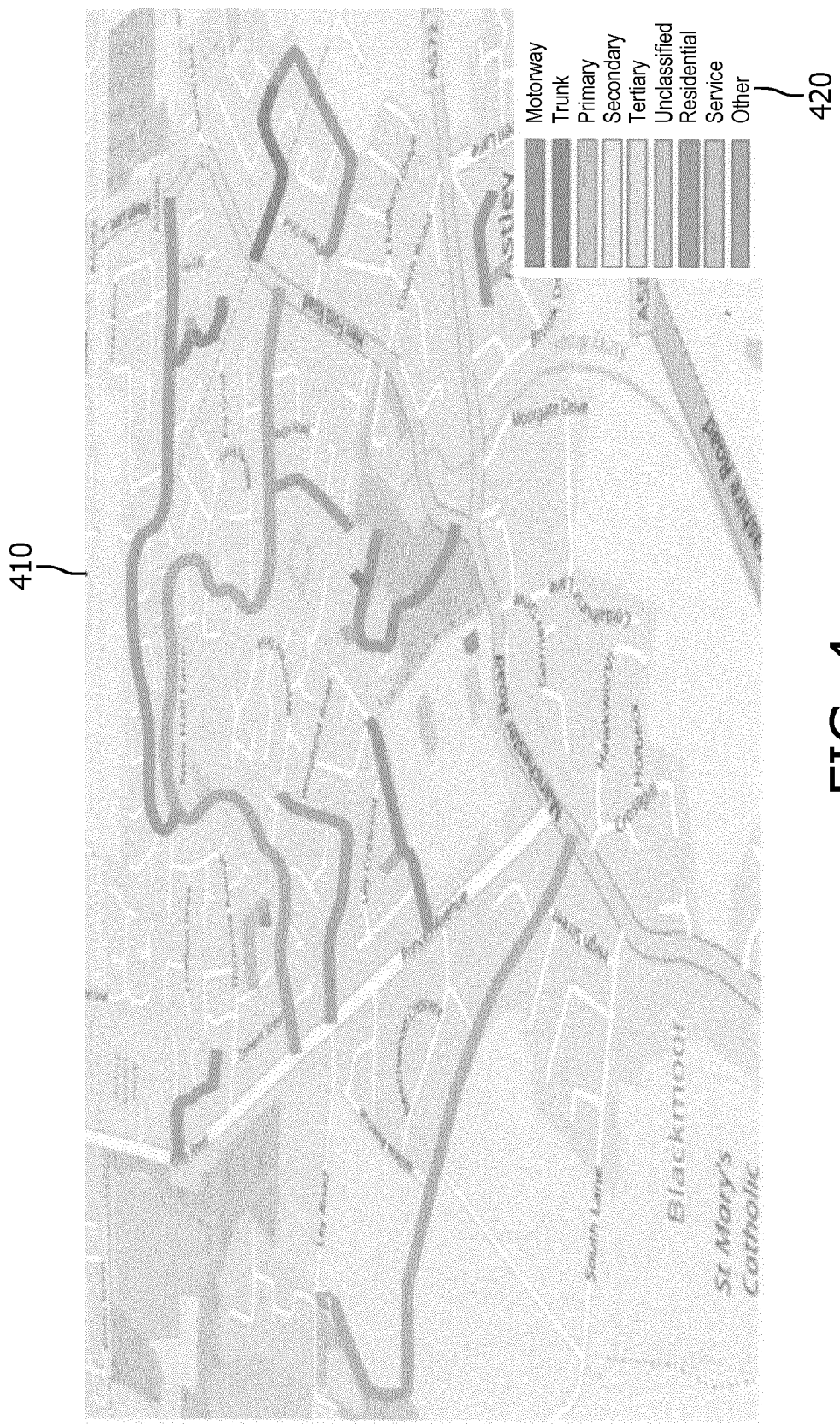
FIG. 4 illustrates an exemplary 3D display provided by the invention in which classifications of one or more roadways are presented.

Additional embodiments of the invention employ automatically determining a roadway's classification and presenting this information in a display as exemplified by FIG. 4. In particular, the invention imports a file which either contains a list of road names or a list of coordinates associated with each road, and then automatically retrieves the detailed information of each road from online open sources. The retrieved information may include, but not limited to, road names, road type (such as highway, residential, etc.), the shape and detailed locations of the road. In one embodiment of the invention, a 3D map 410 is then generated which uses different types of color or shading (as depicted in legend 420) to annotate the roads on the map. Typically, each type of road has its corresponding light design requirements. In those situations, a road's classification can then be used to verify that the lighting conditions on that specific road meet its design requirements.

Figure 5:
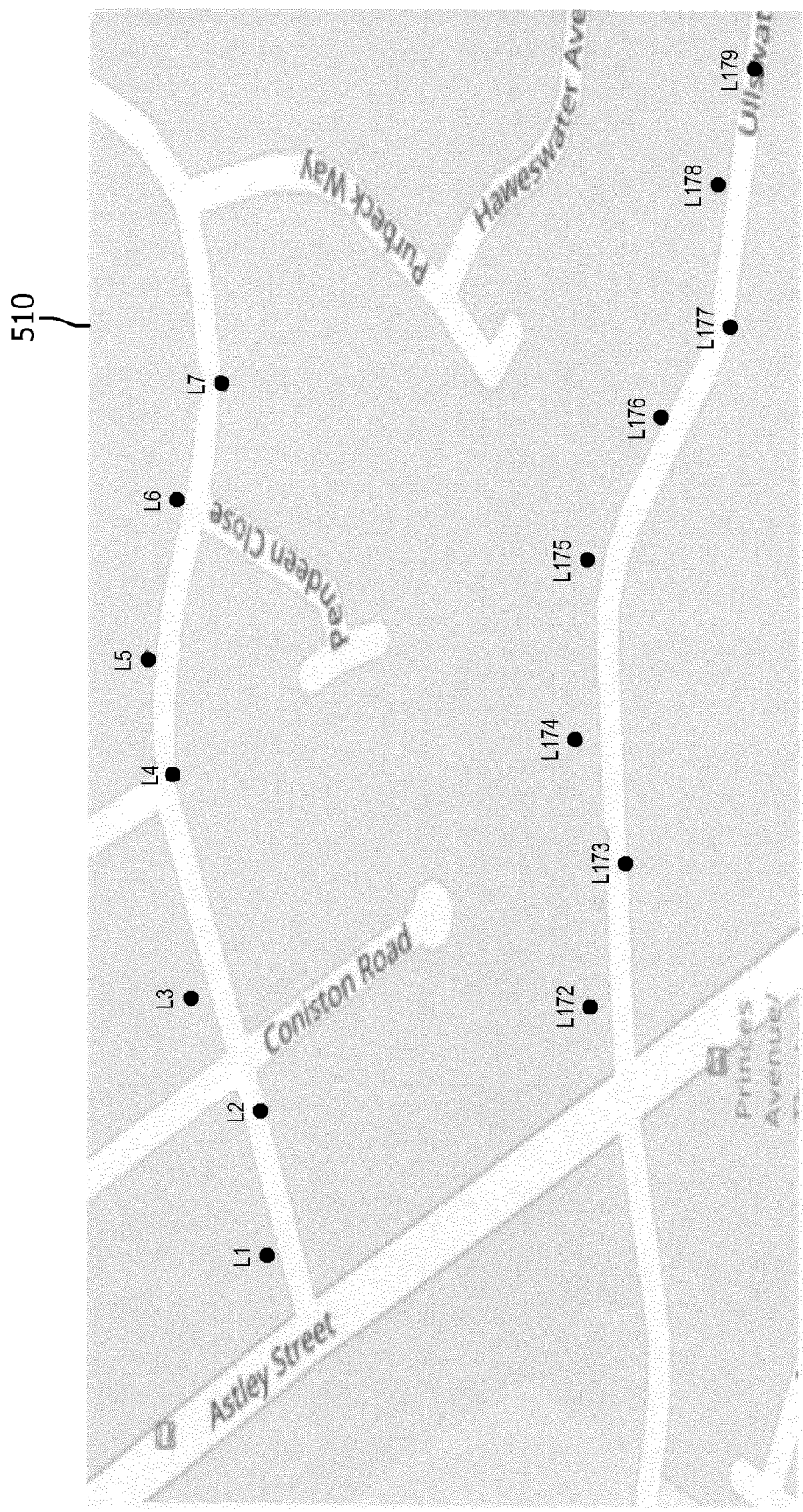
FIG. 5 illustrates an exemplary 3D display provided by the invention in which street lamp positions are indicated on the depicted map.

As noted above, various embodiments of the invention (e.g., FIG. 3) display measured lighting levels relative to the location of light poles present along the roadway. Additional embodiments of the invention employ automatically importing lighting pole location information and presenting this information in a display as exemplified by FIG. 5. In particular, the invention imports one or more files which contain a list of the coordinates of lighting poles. As illustrated in FIG. 5, the invention can then analyze and plot these pole positions (L1-L7, L172-L177) on the depicted map 510. Although not illustrated, it is contemplated that the displayed map could provide overlays of street names (as illustrated in FIG. 4). These features permit users to quickly and clearly get the knowledge of the distribution of the lighting assets, thereby assisting lighting designers to better plan the lighting resources.

In determining the required lighting levels, various regulatory agencies impose specific requirements on the number and placement of sensors relative to the street lights. The resulting sensor measurements are then averaged to obtain a light measurement value that is applied against the applicable standard. By way of example, in the United Kingdom 15 measurement points are required (per TR-28 regulations). Some European countries require a minimum of 30 measurement points (per EN 13201).

Figure 6:
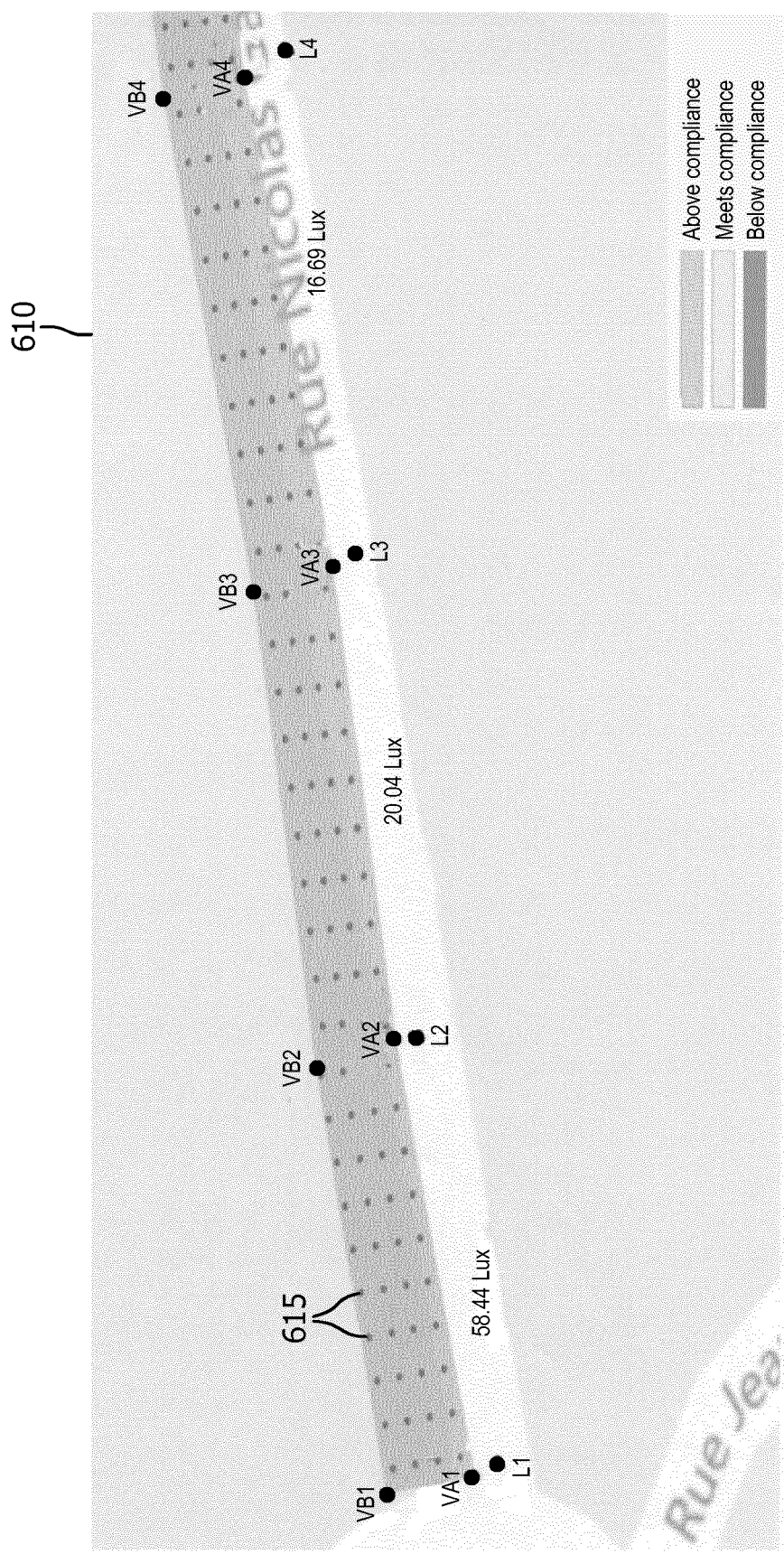
FIG. 6 illustrates an exemplary 3D display provided by the invention in which sensor grid points that comply with lighting regulations are automatically generated.

Additional embodiments of the invention determine where on the roadway the spots where required measurements need to be obtained. FIG. 6 is an exemplary display output 610 which is generated by such an embodiment. It depicts 30 measuring points or spots 615 (between each pair of neighboring street lights (L1-L10). As illustrated in FIG. 6, points labelled $VA_i$ and $VB_i$ are used to mark the road width at the corresponding light location ($L_i$). In various embodiments, the invention can automatically generate the required grid points, and provide the coordinates of each point for further usage. In the display depicted in FIG. 6, the determined averages are displayed (e.g., "58.44 Lux"). Further, as depicted in the display, each section of the road between neighboring pairs of street lights is shaded (or colored) as to whether or not its determined average satisfies the applicable standard. In the example illustrated FIG. 6, all three depicted road section exceed the regulatory compliance level.

Figure 7:
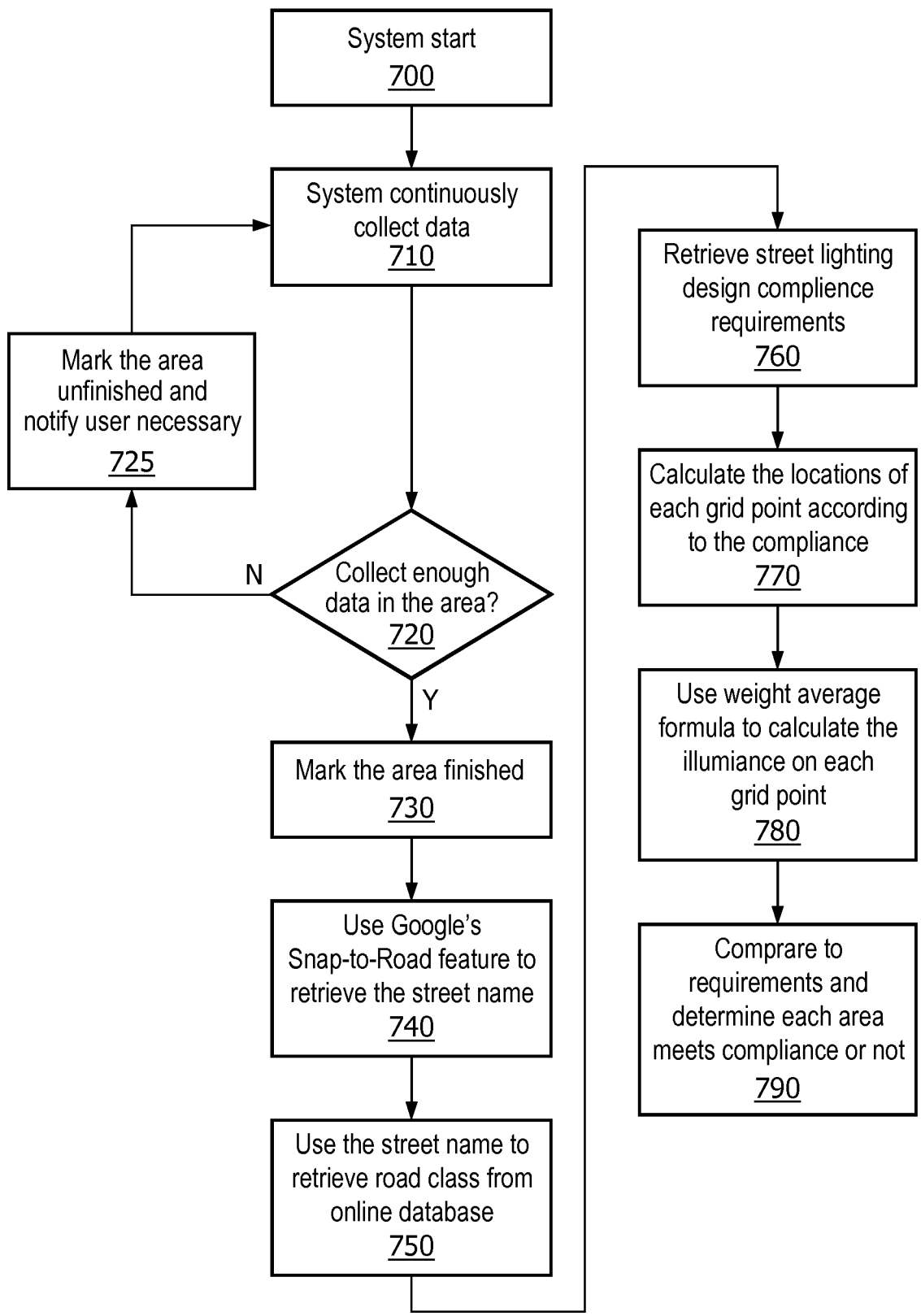
FIG. 7 depicts a flowchart depicting an exemplary method by which the invention determines compliance with lighting standards.

The above described automatic compliance check procedure will now be described with respect to the flowchart provided in FIG. 7. As depicted at step 710, the system continuously collects street lighting data. For each monitored street segment, a decision is made as to the sufficiency of the data (step 720). If the data is insufficient, the area is marked "unfinished," and the collecting entity is so notified. One possibly way of doing so is by employing a real-time map interface which can mark which area needs more data. As a result, additional data is attained and once sufficient, the area is marked "finished" (step 730).

As discussed above, in addition to Lux levels each data point has determined Latitude and Longitude values. At step 740, the correct street's name and basic info (city, state, country) can be identified based on the raw GPS data, (e.g., using Google Maps Roads API-Snap-to-Road feature which provides a function of returning the best-fit road geometry for a given set of GPS coordinates (as described at https://developers.google.com/maps/documentation/roads/intro)). With the street name and information obtained from step 740, more detailed street information can be obtained at step 750 by querying external online map providers or databases, such as OpenStreetMap (https://www.openstreetmap.org/), Google Maps, Microsoft Bing Maps, etc. This data may include information such as road type, width, bicycle friendly, condition, one way, sidewalk, lanes, etc. This obtained data, (e.g., the type of road (highway, residential, secondary, service, etc.) is then used at step 760 to retrieve the applicable light design compliance requirements. Typically a country or a city has a compliance standards and/or regulations defining the street lighting design requirements for each type of street. This information is publically available. These regulations typically include the minimum illumination on the street, the average illumination, how many points to be measured between two lighting poles, and where to place the measuring points. With the road type retrieved from step 750, the lighting design compliance can be determined.

At this point in the depicted method, the system has two sets of data available: (1) the illumination data collected on street and (2) the compliance data. After calculating the minimum values and average values from (1) and comparing with the compliance data (2), the system can report whether or not each segment between every two lighting poles meets the compliance standard (step 790).

In various embodiments, the system could simply use all of the data points collected between two poles to calculate the average illuminance for that segment. To meet compliance standards in most jurisdictions, additional calculations are required as depicted in 770-780; wherein the system would first generate sampling grids (e.g., points 615 as depicted in FIG. 6). As described above, the latitude and longitude of each grid point are known. At step 780 the system would use a weighted average formula to calculate an illuminance value for each grid point, where the weight is decided by the distance between the grid point and the actual location at which the light data was collected. That is by way of example, the collected data point that is closer to the grid point has a higher weight, the data point farther away from the grid point has a lower weight, and if the data point is more than a certain distance away (e.g., 2 meters), then this data point will be ignored for that grid point's evaluation.

With this method, the illuminance value of each grid point can be estimated based on its surrounding illuminance. Then according to the compliance standards, the minimum and average illuminance of this road segment can be calculated based on the determined illuminance of the grid points. The road segment's compliance with lighting requirements are then determined from these average and minimum calculations. That is, compliance defines two type of values that must be meet:

1. The average Lux value of the whole segment area, which is calculated by using all of the grid points in that area. If the average value is less than certain value as defined in the compliance requirements, then the segment fails to comply.
2. The minimum Lux value of all of the grid points in the segment area. If the lowest grid point is less than certain value as defined in the compliance requirements, then the segment fails to comply.

Although not illustrated in the figures to avoid unnecessarily cluttering the drawings, various interactive functions that are well-known in the map display art are contemplated by the invention. Such functions, include but are not limited to various navigation buttons and arrows, zoom in/zoom out functions, drop-down menus, help buttons, etc. Thus, by way of example, such functions enable a user viewing the display depicted in FIG. 5 to simply scroll to the right to get information about additional light pole positions not currently illustrated.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The principles of the present invention are implemented as any combination of hardware, firmware and software. Moreover, the software is preferably implemented as an application program tangibly embodied on a program storage unit or computer readable storage medium consisting of parts, or of certain devices and/or a combination of devices. The application program may be uploaded to, and executed by, a machine comprising any suitable architecture. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method of managing compliance with lighting requirements for one or more sections of a roadway surface, wherein the one or more sections includes one or more lights, the method comprising:
    collecting light measurement data and corresponding GPS determined locations associated with each collected light measurement;
    creating a display depicting one or more sections of the roadway;
    determining for a given section of the roadway its classification;
    obtaining the regulatory lighting lux standard for such a classification;
    determining each sections' level of compliance with regulatory lighting requirements based on the classification; and
    visually depicting on the display the level of compliance for one or more sections of the roadway; and
    determining an estimated light luminance value at each test point by performing a weighting function on at least one location's light measurement data, the weighting being based on the location's proximity to the test point.

2. The method of claim 1, further including the step of adjusting the one or more lights based on the level of compliance in a respective section.

3. The method of claim 1 wherein said visually depicting step comprises shading or color coding to indicate the one or more sections' level of compliance.

4. The method of claim 1 wherein the display is a three dimensional (3D) display and said visually depicting step comprises superimposing onto the 3D display an indication of at least some of the luminance values, wherein the magnitude of at least some of said luminance values are indicated by vertical lines.

5. The method of claim 4 wherein the 3D display indicates by line style or color of the vertical lines associated with one or more sections of the roadway, the level of compliance of each depicted section.

6. The method of claim 1 further comprising:
determining positions of light poles along the given section of the roadway and indicating these positions on the display; and,
indicating on the display test points relative to the light pole positions, which test points being required by the regulatory requirements.

7. The method of claim 1 further comprising:
depicting on the display, an average lux reading using estimated light luminance values determined for a section of the roadway; and,
providing an indication on the display whether the section of the roadway meets the lighting lux standard, based upon the average lux reading.

8. The method of claim 1 further comprising:
depicting on the display, a minimum lux reading for estimated light luminance values determined for a section of the roadway; and,
providing an indication on the display whether the section of the roadway meets the lighting lux standard, based upon the minimum lux reading.

9. A computer program product comprising a plurality of program code portions, stored in a non-transitory computer readable medium, for carrying out the method according to claim 1.

10. The method of claim 1, wherein the classification includes one or more of road names, road type, including a highway or residential road, and the shape of the road.

11. A system for of managing light luminance values measured at locations along one or more sections of the roadway surface, wherein the one or more sections includes one or more lights, the system comprising a central processor;
a mobile device equipped with GPS functionality for obtaining light luminance values along one or more sections of a roadway and the locations at which those values were obtained;
a communication system operably connecting the central processor and the mobile device;
a database including the classification of the one or more sections of the roadway and the regulatory lighting lux standard for each roadway classification;
a display device for depicting a display of one or more sections of the roadway; and,
wherein the central processor determines each sections level of compliance with regulatory lighting requirements based on the classification and causes the display to visually illustrate the level of compliance for one or more sections of the roadway;
the central processor determines an estimated light luminance value at each test point by performing a weighting function on at least one location's light measurement data, based on the location's proximity to the test point; and,
wherein the estimated light luminance values are used in determining compliance with regulatory requirements.

12. The system of claim 11 further comprising:
the central processor determines positions of light poles along the given section of the roadway and indicates on the display, test points relative to the light pole positions, which test points being required by the regulatory requirements.

13. The system of claim 11 further comprising:
the display depicts an average lux reading using estimated light luminance values determined for a section of the roadway; and,
the display provides an indication on the display whether the section of the roadway meets the lighting lux standard, based upon the average lux reading.

14. The system of claim 11 further comprising:
the display depicts a minimum lux reading for estimated light luminance values determined for a section of the roadway; and,
the display provides an indication on the display whether the section of the roadway meets the lighting lux standard, based upon the minimum lux reading.

* * * * *